UNITED STATES PATENT OFFICE.

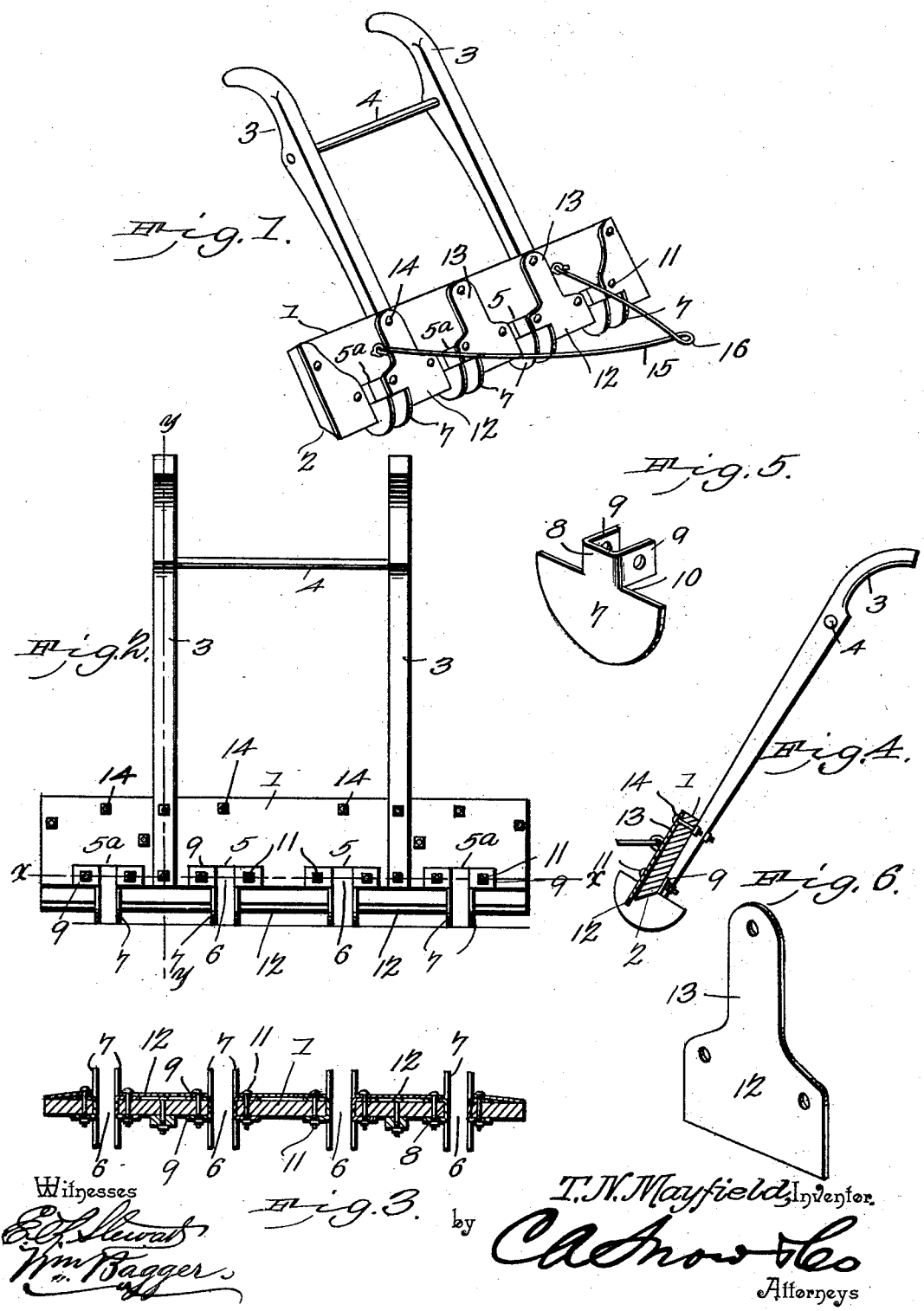

THOMAS N. MAYFIELD, OF DYKESVILLE, LOUISIANA.

COTTON-CHOPPER.

SPECIFICATION forming part of Letters Patent No. 713,898, dated November 18, 1902.

Application filed August 6, 1902. Serial No. 118,677. (No model.)

*To all whom it may concern:*

Be it known that I, THOMAS N. MAYFIELD, a citizen of the United States, residing at Dykesville, in the parish of Claiborne and State of Louisiana, have invented a new and useful Cotton-Chopper, of which the following is a specification.

This invention relates to that class of cultivating devices which are known as "cotton-choppers" and to that species of the same in which is embodied a drag adapted to operate transversely to the rows and equipped with hoes for chopping out or removing the superfluous plants.

My invention has for its object to provide a device of this class which shall be simple and inexpensive in its construction, in which fenders of an improved construction shall be arranged contiguous to the rows, so as to prevent injury to the plants which are left in the rows, and in which the hoes and fenders shall be so arranged as to mutually brace and strengthen each other.

With these and other ends in view the invention consists in the improved construction, arrangement, and combination of parts, which will be hereinafter fully described, and particularly pointed out in the claims.

In the accompanying drawings, Figure 1 is a perspective view showing a cotton-chopper constructed in accordance with my invention. Fig. 2 is a rear view of the same. Fig. 3 is a horizontal sectional view of the same, taken on the line $x\ x$ in Fig. 2. Fig. 4 is a vertical sectional view taken on the line $y\ y$ in Fig. 2. Fig. 5 is a detail view of one of the fenders detached. Fig. 6 is a detail view of one of the hoes detached.

Corresponding parts in the several figures are indicated by like characters of reference.

The body of my improved cotton-chopper is composed of a beam 1, beveled at its lower edge, as shown at 2. Handles 3 3 are suitably attached to the rear or under side of said beam, and said handles are connected by means of a brace 4. The edge of the beam 1 is provided with a series of notches 5 5, each of which is of a width equal to the width of the "stands" which it is desired to leave, the spaces 6 between the notches being of a width equal to the distance which the stands are to be left apart. The distances from the end notches, which are specially designated $5^a$, to the ends of the beam are to be slightly more than half the width of the spaces 6 in order that at each consecutive round of the machine the last round preceding may be slightly overlapped and the work be performed with regularity, as will be readily understood.

The sides of each of the notches 5 and $5^a$ are guarded by means of fenders 7, which consist of approximately semicircular plates of sheet metal, steel preferred, the upper edges of which are provided with flanges 8, having laterally-extending arms 9, which may be formed by simply making cuts or incisions 10 parallel to the upper edges of the plates from which said fenders are formed and then bending the arms 9 at right angles to said plates. The distance between the arms 9 should be equal to the thickness of the beam 1, upon which the said fenders are placed by placing the fenders 7 contiguous to the edges of the notches 5 and $5^a$, with the arms 9 fitted against opposite sides of the said beam. They are secured in position by means of bolts 11, which also serve for the attachment of the hoe-blades, as will be now described. The said hoe-blades, like the fenders 7, are constructed of sheet metal, steel preferred, and they comprise the rectangular portions 12, adapted to fit upon the portions of the beam 1 intermediately between the notches therein and having upwardly-extending shanks 13 lying flat against the face of the beam. These blades when placed in position should project slightly below the lower edge of the beam 1, as clearly shown in the drawings, so as to present a wear edge to the work. They are secured by means of the bolts 11, which also pass through the arms 9 of the fenders, and by additional bolts 14, passing through the shanks 13 thereof and through the beam.

At the ends of the device the hoe-blades are conformed to the shape of the beam, as will be readily understood—that is, they are longitudinally divided, so as to fit the portions of the beam outside of the notches $5^a$.

Suitably attached to the face of the beam 1 is a yoke 15, having a loop 16 for the attachment of the singletree, to which the horse by which the device is operated may be attached.

The operation of my invention will be readily understood. The device is dragged over the ground transversely to the rows of growing plants. When a row is reached, the operator by using the handles 3 will tilt the beam, so as to cause the hoes to dig into the soil, thus causing them and the fenders to remove the desired portions of the row of plants, which may be carried some little distance upon the hoes, when by again tilting the device they may be discharged. The fenders, in addition to guarding the stands from injury, serve to cut into the soil adjacent to the ends of the hoes, thus assisting the latter in removing the surplus plants, and they serve the additional purpose of forming rockers, whereby the tilting of the device at the desired points is greatly facilitated.

Having thus described my invention, I claim and desire to secure by Letters Patent of the United States—

1. In a device of the class described, a beam having notches therein, fenders secured to the said beam adjacent to the sides of the notches, and hoes secured to the face of the beam between said notches, substantially as set forth.

2. In a device of the class described, a beam having notches therein and fenders disposed at the sides of said notches and having arms disposed on opposite sides of the beam, substantially as set forth.

3. In a device of the class described, a beveled-edged beam having notches therein and fenders disposed at the sides of said notches and having arms disposed on opposite sides of the beam, substantially as set forth.

4. In a device of the class described, a body member having notches at the edge thereof, fenders disposed at the sides of said notches, and hoes disposed intermediately between the notches, substantially as set forth.

5. In a device of the class described, a body member having notches in the edge thereof, fenders disposed at the edges of said notches and having arms disposed on opposite sides of said body member, and hoes disposed upon the face of the latter, intermediately between the notches thereof and secured by fastening means extending through the body member and through the arms of the fenders, substantially as set forth.

6. In a cotton-chopper having a notched body member, a fender consisting of an approximately semicircular plate having incisions formed approximately parallel to its upper edge, the arms thus formed being bent at approximately right angles to the body of the plate, substantially as set forth.

7. In a cotton-chopper having a notched body member, a rocker-shaped fender having laterally-extending arms, substantially as set forth.

8. In a cotton-chopper having a notched body member, a rocker-shaped fender having laterally-extending arms to engage opposite sides of a body member, notched to receive said fender, substantially as set forth.

9. The combination of a body member having notches in the edge thereof, rocker-shaped fenders disposed adjacent to the sides of said notches, and intermediately-disposed hoes, substantially as set forth.

10. The combination of a body member having notches in the edge thereof, rocker-shaped fenders disposed adjacent to the sides of said notches and having arms disposed on opposite sides of the body member, hoes disposed upon the face of the latter, covering the front arms of the fenders, and fastening means extending through said hoes, the fender-arms and the body member, substantially as set forth.

11. The combination of a beveled-edged body member having notches in the edge thereof, rocker-shaped fenders disposed adjacent to the sides of said notches and having arms disposed on opposite sides of the body member, hoes disposed upon the face of the latter, covering the arms of the fenders and having edges extended below the beveled edge of the body member, and fastening means extending through said hoes, the fender-arms and the body member, substantially as set forth.

In testimony that I claim the foregoing as my own I have hereto affixed my signature in the presence of two witnesses.

THOMAS N. MAYFIELD.

Witnesses:
M. O. KNEDBREW,
O. P. BAILEY.